United States Patent [19]
Thomas et al.

[11] Patent Number: 5,360,630
[45] Date of Patent: Nov. 1, 1994

[54] THIN FILM INTAGLIATED PHOSPHOR SCREEN STRUCTURE

[75] Inventors: Nils I. Thomas; Larry D. Kiser, both of Roanoke, Va.

[73] Assignee: ITT Corporation, New York, N.Y.

[21] Appl. No.: 881,308

[22] Filed: May 7, 1992

Related U.S. Application Data

[63] Continuation of Ser. No. 533,074, Jun. 4, 1990, abandoned.

[51] Int. Cl.$^5$ ............................................. B05D 5/06
[52] U.S. Cl. ................................. 427/67; 427/691; 427/157; 427/255.21; 427/249; 427/307; 427/355; 427/380; 427/309; 427/163.2
[58] Field of Search ............... 427/157, 64, 309, 367, 427/380, 163, 69, 289, 355, 255.2

[56] References Cited

U.S. PATENT DOCUMENTS

| | | | |
|---|---|---|---|
| 4,264,408 | 4/1981 | Benham | 156/629 |
| 4,298,820 | 11/1981 | Bongers et al. | 313/463 |
| 4,755,718 | 7/1988 | Patrick | 313/524 |
| 4,849,000 | 7/1989 | Patrick | 65/4.3 |
| 4,886,537 | 12/1989 | Patrick | 65/4.3 |
| 4,976,988 | 12/1986 | Honda | 427/69 |

OTHER PUBLICATIONS

Maple et al, "rf Sputtered Luminescent Rare-Earth Oxysulfide Films" J. Vac. Sci. Technol, vol. 10, No. 5, Sep./Oct. 1973. pp. 616-620.

Primary Examiner—Janyce Bell
Attorney, Agent, or Firm—Arthur L. Plevy; Patrick M. Hogan

[57] ABSTRACT

A thin film, intagliated phosphor screen structure includes an optical fiber bundle in which each of the fibers has its glass core etched below the level of its cladding sheath at the internal surface of the screen, and a phosphor layer is deposited as a thin film which fills in the core recesses. Preferably, the upper surfaces of the core recesses are formed with a spherical or parabolic shape, which is obtained by surface tension when the phosphor film is annealed. The upper surfaces of the phosphor layers may also be finished by polishing. An aluminum reflective layer may also be coated on the phosphor layer. The bottom walls of the cores are preferably etched to be convex or concave to provide a lens effect. The intagliated phosphor screen can transmit 90% to 95% or more of the light generated in the phosphor layers, for an output gain factor of 5 or more over conventional phosphor screens.

18 Claims, 3 Drawing Sheets

THIN FILM INTAGLIATED PHOSPHOR SCREEN STRUCTURE

This is a continuation of application Ser. No. 07/533,074 filed Jun. 4, 1990, now abandoned.

FIELD OF INVENTION

The present invention relates to an improved phosphor screen structure, and particularly, to such a phosphor screen having a thin film intagliated phosphor layer on an optical fiber bundle for enhanced screen output efficiency.

BACKGROUND OF THE INVENTION

Luminescent phosphor screens are used in cathode ray tubes, for example, television display tubes, electron display devices, imaging devices, for example, image intensifier tubes, etc. Typically, a thin layer of phosphor material containing a luminescence activator is supported on a substrate. The phosphor layer is activated by impingement of an electron beam, and the resulting luminescence is transmitted through the glass substrate to the front of the display.

Phosphor screens, such as those used in image tubes, are made with phosphor powders. The powder is applied to a substrate glass plate or an optical fiber bundle by and one of several known methods, such as settling, brushing, spraying, etc. However, the use of powdered phosphors has numerous disadvantages. The powdered phosphors are not very adherent to the substrate. Typically, some sort of binder must be used to hold the phosphor particles to the substrate, which complicates the production process. Also, the powder is difficult to apply uniformly, leading to low process yields of acceptable units. The powders also have a high surface area which absorbs large amounts of gas from the phosphor constituents. This high outgassing characteristic is extremely undesirable for use in vacuum tubes where pressures of $10^{-10}$ torrs are achieved. Powdered phosphors also have a low optical resolution due to scattering off of the particles.

One proposal has attempted to apply powdered phosphors into intagliated (etched) recesses or wells formed in the core glass of the individual fibers of an optical fiber bundle in order to increase the resolution of the screen. Such an intagliated powdered-phosphor screen is described, for example, in "Intagliated Phosphor Screen Image Tube Project", by Richard J. Hertal, ITT Aerospace/Optical Division, prepared for NASA under Contract NAS5-26417, May 1982. However, this structure has a complicated manufacturing process and all of the other disadvantages of powdered phosphors.

Non-particulate, solid phosphor films have been used in display panel technology. The phosphor layer may be formed as a monocrystalline layer grown on a substrate by liquid phase epitaxy (LPE), or as a thin film deposited by evaporation, sputtering, or vapor deposition (MOCVD/MOVPE) techniques. Such phosphor layers have a relatively high thermal loadability, high resolution, and a low outgassing characteristic in a vacuum tube. However, the solid phosphor films suffer from low optical efficiency, making them undesirable for certain applications, such as image tube screens. The low optical efficiency of solid phosphor films is caused by large internal reflection losses within the film.

U.S. Pat. No. 4,264,408 entitled METHODS FOR APPLYING PHOSPHORS PARTICULARLY ADAPTED FOR INTAGLIATED PHOSPHOR SCREENS issued on Apr. 28, 1981 to J. D. Benham and assigned to The International Telephone and Telegraph Corporation, the assignee herein. This patent depicts a method for applying dry powder particles on an intagliated array of fibers. A thin layer of a heated thermoplastic is formed on the surface of the substrate to uniformly coat the etched pits. The thin layer is then heated to receive phosphor particles which become embedded in the plastic. The plastic layer is removed and the screen is then secured with a binder to fix the particles within the etched pits.

The problem of internal reflection losses in solid phosphor films is illustrated schematically in FIG. 1. An electron beam $e^-$ impinges on the phosphor layer through a metal layer, e.g. aluminum, which is optional in some applications. The electron beam activates an activator element, for example, copper in zinc-sulfide based phosphors, or cerium in yttrium-aluminum-garnet phosphors, which causes electrons to be released and photons from the nearby phosphor material to be emitted with a luminescence effect in all directions. Due to the difference in index of refraction between the phosphor layer and the substrate layer, such as glass, light rays which are incident at an angle greater than the critical angle CA are reflected laterally and become trapped and dissipated within the film. Another form of light loss is attributable to reflections from the substrate layer even within the cone (indicated by the dashed lines) of the critical angle CA, which increases as the light rays approach the critical angle.

As an example, the internal reflection loss due to the refraction difference for ZnS based phosphors grown on Corning type 7056 glass substrate can be in the range of 70% to 80% of the light emitted. Within the acceptance angle, the reflection loss can be another 10% to 25%, for a total loss of about 90% to 95% of the radiated energy. Such high losses result in lower phosphor efficiencies as compared to powdered phosphors. The result is that thin film phosphors have had limited application heretofore.

Some researchers have proposed forming reticulated structures in the phosphor layer to break up the waveguide effect and enhance light output. For example, U.S. Pat. No. 4,298,820 to Bongers et al. discloses the technique of etching V-shaped grooves in square patterns in the surface of the phosphor layer to obtain improved phosphor efficiency by a factor of 1.5. However, the etching process used in Bongers has been found to be impractical for large volume production.

Etching the activated portion of the phosphor layer, with reticulations in the form of trapezoid- or truncated-cone-shaped mesas and overcoating with a reflective aluminum film to form light confining surfaces, has been proposed in the article entitled "Reticulated Single-Crystal Luminescent Screen", by D. T. C. Huo and T. W. Huo, Journal of Electrochemical Society, Vol. 133, No. 7, pp. 1492-97, July 1986, and in "RF Sputtered Luminescent Rare Earth Oxysulfide Films", by Maple and Buchanan, Journal of Vacuum Technology, Vol. 10, No. 5, pg. 619, Sep./Oct. 1973. These trapezoidal mesas improve the light output by a factor of about 2, whereas a factor of 6 or higher would represent output of most of the emitted light. The light output factor could be increased if the mesa size could be made less than 5 microns and the shape made with the optimum reflection angle. However, such a small mesa size requires high lithography resolution and is limited by diffraction from the lithography mask. Crystalline phosphors will also preferentially etch along crystalline planes which are different from the optimum slope angle for the trapezoid shape. Thus, application of trapezoidal mesas and reticulated layers has also been limited.

SUMMARY OF THE INVENTION

It is therefore a principal object of the invention to provide a thin film phosphor screen which has a high optical screen output efficiency and which is relatively simple and inexpensive to manufacture. It is a particular object to improve screen efficiency by a factor of 5 or greater, so that 90% to 95% or more of the emitted light is transmitted from the phosphor layer externally, while also maintaining a high resolution and a low outgassing characteristic.

In accordance with the invention, a thin film, intagliated phosphor screen structure comprises a light-transmitting substrate having a plurality of transmission meters arranged in parallel extending between an internal surface and an external, display surface, wherein each of the transmission members includes a core portion disposed within a cladding portion, and the core portions at the internal surface are etched to form recesses below the level of the cladding portions, and a thin film phosphor layer formed in each of the core recesses of the transmission members of the substrate.

In the preferred embodiment, the substrate is an optical fiber bundle having a plurality of individual fibers arranged in parallel. Each of the fibers has its glass core etched below the level of its cladding sheath at the internal surface of the screen, and the phosphor layer is deposited as a thin film onto the internal surface so as to fill in the core recesses. Preferably, the upper surfaces of the phosphor layers deposited in the recesses have a spherical or parabolic shape, which can be achieved normally by surface tension when the phosphor film is annealed. The upper surfaces of the phosphor layers may also be finished by polishing. An aluminum reflective layer may also be coated on the phosphor layer. The bottom walls of the cores are preferably etched to be convex or concave to provide a lens effect. The invention also comprises the corresponding method of producing such a thin film, intagliated phosphor screen structure.

BRIEF DESCRIPTION OF THE DRAWINGS

The above objects and further features and advantages of the invention are described in detail below in conjunction with the drawings, of which.

DETAILED DESCRIPTION OF THE INVENTION

Figure 1:
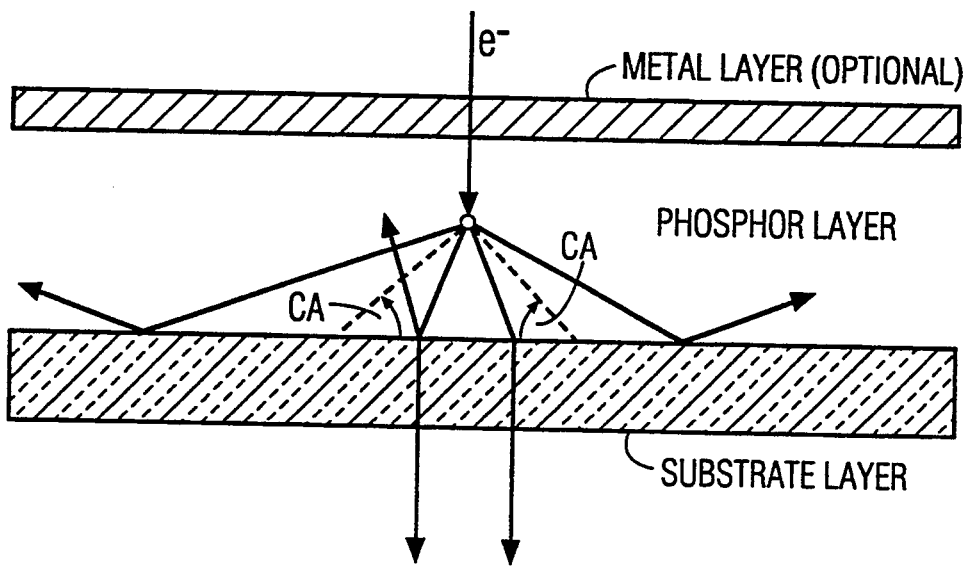
FIG. 1 is a schematic diagram of a conventional thin film phosphor screen.
Figure 2:
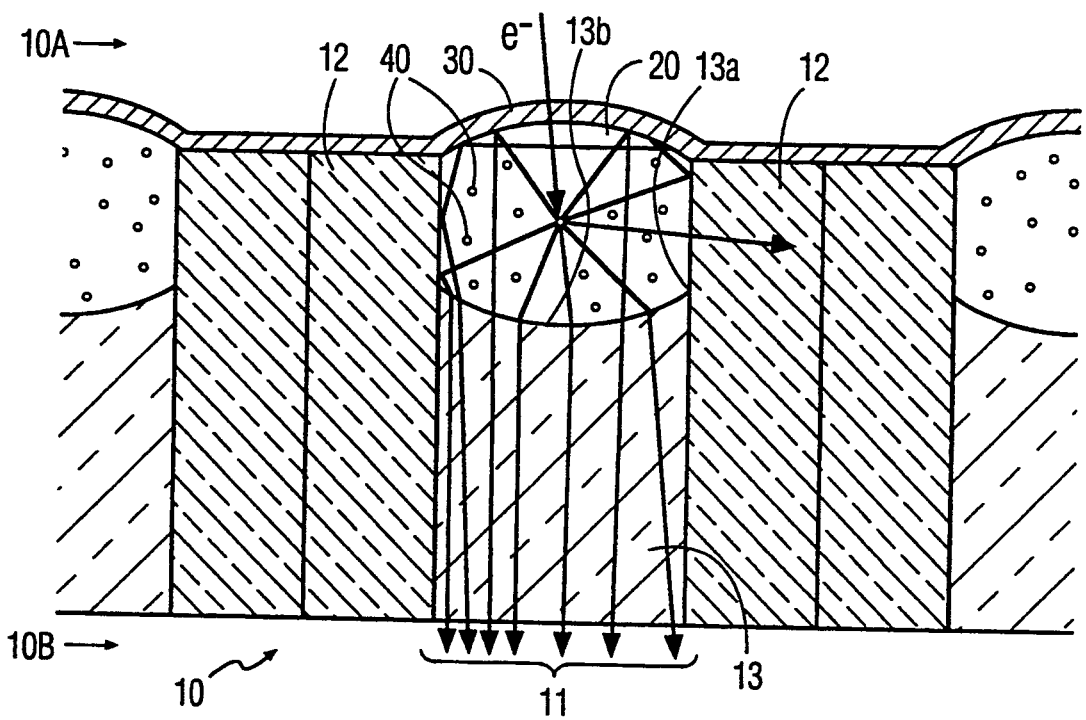
FIG. 2 is a schematic diagram of a thin film, intagliated phosphor screen structure, in accordance with the invention, in which phosphor thin films are deposited in the intagliated recesses of an optical fiber bundle.

Referring to FIG. 2, one embodiment of the invention is shown having a substrate 10 in the form of an optical fiber bundle consisting of a plurality of individual fibers 11 arranged in parallel extending between an internal surface 10A and an external surface 10B of the screen. The internal surface 10A is exposed to the electron beam from an imaging source, and the external surface 10B transmits the generated light as display illumination. Each individual fiber consists of a core portion 13 sheathed in a cladding portion 12. At the side toward the internal surface 10A, each of the cores 13 is etched to a level below that of the cladding portion 12 to form a recess 13a. The recess 13a is filled with a thin film layer of phosphor material 20. A reflective layer 30 of reflective metal such as aluminum may be coated over the phosphor layers.

The upper surfaces of the phosphor layers 20 are preferably formed with a spherical or parabolic shape which, in conjunction with the reflective layer 30, causes light emitted in the upward direction from light emission centers 40 in the phosphor material to be reflected (after one reflection) for transmission through the external surface 10B. A detailed discussion of an implementation and the advantages of parabolic phosphor shapes, or "parabolic mesas", is given in the copending U.S. patent application Ser. No. 07/785,092, filed Oct. 30, 1991, now U.S. Pat. No. 5,137,598, of Nils I. Thomas, which is incorporated herein by reference. The bottom walls 13b of the recesses 13a may be etched to have a concave or convex shape to act as a lens for downwardly directed light rays from the emission centers 40 in order to enhance the light output. The cladding portions 12 are made of an acid resistant glass as compared to the core portions 13 in order to allow the core portions to be etched readily. The difference in refraction indices of the glass also results in a critical angle at the cladding/core interface which will allow most of the light rays directed laterally from the emission centers to be reflected from the cladding surface so that they are thereafter transmitted or further reflected toward the external surface 10B.

Figure 3:
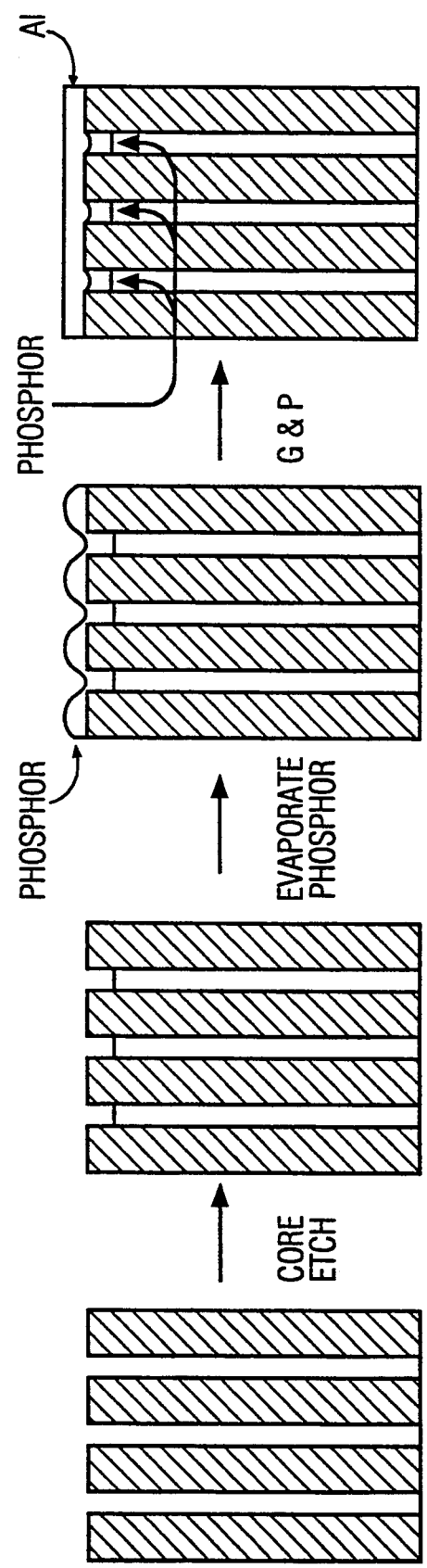
FIG. 3 illustrates one process for making a thin film, intagliated phosphor screen.

In FIG. 3, a preferred process for making an intagliated thin film phosphor screen includes the steps of etching the cores of the individual fibers of the optical fiber bundle to form recesses at the internal surface. Phosphor layers are then deposited as solid thin films in the recesses, e.g. by vapor deposition of zinc sulfide (ZnS). The phosphor layers will tend to coat over the tops of the cladding portions and dip into the core portions. The excess phosphor over the cladding portions can then be removed by grinding and polishing (G&P), and an aluminum reflective layer is coated over the internal surface of the screen. The light output gain factor for the resulting intagliated screen is about 2.0 or more, which is sufficient for image tube applications.

Figure 4:
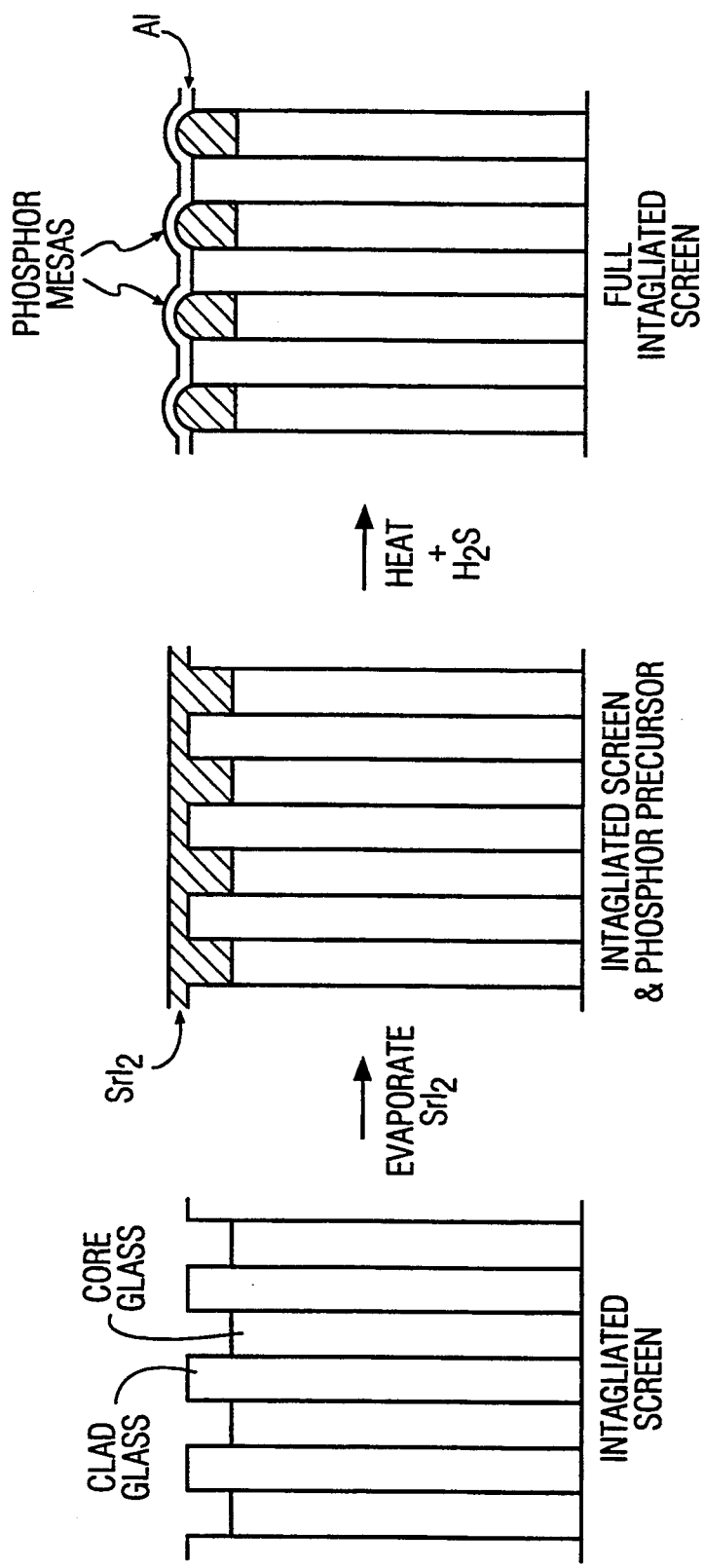
FIG. 4 illustrates another process including an annealing step for forming spherical surfaces on the phosphor layers at the internal surface of the screen.

In FIG. 4, a modified process is illustrated in which strontium iodide ($SrI_2$), a phosphor precursor, is coated onto the intagliated surface of the screen. The coated surface is then heated in the presence of a reducing atmosphere of hydrogen sulfide ($H_2S$). The intagliated core will act as a nucleation site for the resulting phosphor material SrS, causing the phosphor to "ball up" when it is annealed by surface tension. The resulting structure is an intagliated screen with spherical mesas at the internal surface. When coated with a reflective layer, substantially all of the light generated is transmitted to the external surface of the screen, resulting in an optical gain near the theoretical limit. As a result, 90% to 95% or more of the light emitted from the emission centers is transmitted as light output, and the external screen efficiency of the described phosphor screen structure is improved by a factor of 5 or more compared to conventional phosphor films.

The resolution in a fiber optic screen is related to the fiber size and would conventionally be decreased by a powdered phosphor layer. However, use of thin film phosphor layers in accordance with the invention maintains the high resolution of thin film phosphor screens, while intagliation of the fibers, etching concave or convex bottoms in the cores, finishing with spherical mesas, and coating with a reflective layer all combine to enhance optical brightness to the theoretical limit. The thin film, intagliated phosphor layer does not degrade the screen resolution appreciably. As the fiber size becomes the only limiting factor in screen resolution, the fiber size can be appropriately selected to match the intended screen resolution.

The specific embodiments of the invention described herein are intended to be illustrative only, and many other variations and modifications may be made thereto in accordance with the principles of the invention. All such embodiments and variations and modifications thereof are considered to be within the scope of the invention, as defined in the following claims.

We claim:

1. A method of making a continuous thin film, intagliated phosphor screen structure comprising the steps of:
   providing a light-transmitting substrate having a plurality of transmission members arranged in parallel extending between an internal surface and an external, display surface, wherein each of the transmission members includes a core portion disposed within a cladding portion;
   etching the core portions at the internal surface of the screen structure to form recesses below the level of the cladding portions, said recesses having bottom surfaces with a concave curved meniscus shape to provide a lens effect which enhances the light output entering said transmission members; and
   forming a continuous thin film phosphor layer over the entire internal surface of said transmission members and completely covering all the core recesses and cladding portions of said transmission members at said internal surface, said continuous phosphor layer having a plurality of depressions, each of said depressions corresponding to an associated core recess and with each of said depressions extending into and filling the associated core recess.

2. A method of making a continuous thin film, intagliated phosphor screen structure according to claim 1, wherein said substrate is an optical fiber bundle having a plurality of individual fibers arranged in parallel and each of the fibers has a glass core and an associated cladding sheath extending between said internal and said external surface, and wherein said glass core is etched below the level of said cladding sheath at the internal surface of the screen.

3. A method of making a continuous thin film, intagliated phosphor screen structure according to claim 1, wherein said continuous phosphor layer further includes an upper surface opposite each of said bottom surfaces of each of said recesses, said upper surface having a spherical or parabolic shape.

4. A method of making a continuous thin film, intagliated phosphor screen structure according to claim 1, further comprising the step of coating a solid reflective layer over said continuous phosphor layer at the internal surface of the screen structure.

5. A method of making a continuous thin film, intagliated phosphor screen structure according to claim 3, further comprising the step of coating a solid reflective layer over said continuous phosphor layer at the internal surface of the screen structure.

6. A method of making a continuous thin film, intagliated phosphor screen structure according to claim 4, wherein said reflective layer is an aluminum film deposited on said upper surfaces of said continuous phosphor layer.

7. A method of making a continuous thin film, intagliated phosphor screen structure comprising the steps of:
   providing a light-transmitting substrate having a plurality of transmission members arranged in parallel extending between an internal surface and an external, display surface, wherein each of the transmission members includes a core portion disposed within a cladding portion;
   etching the core portions at the internal surface of the screen structure to form recesses below the level of the cladding portions, said recesses having bottom surfaces with a curved shape to provide a lens affect which enhances the light output entering said transmission members;
   depositing a continuous thin film phosphor layer over the entire external surface of said transmission members by vapor deposition, said continuous phosphor layer completely covering all the core recesses and cladding portions of said transmission members at said internal surface, said continuous phosphor layer having a plurality of depressions, each of said depressions corresponding to an associated core recess with each of said depressions extending into and filling the associated core recess; and
   removing said continuous phosphor layer over said cladding portions by grinding and polishing.

8. A method of making a continuous thin film, intagliated phosphor screen structure comprising the steps of:
   providing a light-transmitting substrate having a plurality of transmission members arranged in parallel extending between an internal surface and an external, display surface, wherein each of the transmission members includes a core portion disposed within a cladding portion;
   etching the core portions at the internal surface of the screen structure to form recesses below the level of the cladding portions, said recesses having bottom surfaces with a curved shape to provide a lens effect which enhances the light output entering said transmission members;
   depositing a continuous thin film phosphor layer over the entire internal surface of said transmission members by vapor deposition, said continuous phosphor layer completely covering all the core recesses and cladding portions of said transmission members at said internal surface, said continuous phosphor layer having a plurality of depressions, each of said depressions corresponding to an associated core recess, with each of said depressions extending into and filling the associated core recess; and
   annealing said continuous phosphor layer such that said continuous phosphor layer over said cladding portion balls up and forms a spherical surface over the core recesses.

9. A method of making a continuous thin film, intagliated phosphor screen structure according to claim 8, wherein said continuous phosphor layer is a phosphor precursor and the annealing step includes reducing the precursor material in a reducing atmosphere.

10. A method of making a continuous thin film, intagliated phosphor screen structure according to claim 9, wherein said phosphor precursor is strontium iodide, and said reducing atmosphere is hydrogen sulfide gas.

11. A method of making a continuous thin film, intagliated phosphor screen structure comprising the steps of:
providing a light-transmitting substrate having a plurality of transmission members arranged in parallel extending between an internal surface and an external, display surface, wherein each of the transmission members includes a core portion disposed within a cladding portion;
etching the core portions at the internal surface of the screen structure to form recesses below the level of the cladding portions, said recesses having bottom surfaces with a curved shape to provide a lens effect which enhances the light output entering said transmission members;
forming a continuous thin film phosphor layer over the entire internal surface of said transmission members and completely covering all the core recesses and cladding portions of said transmission members at said internal surface, said continuous phosphor layer having a plurality of depressions, each of said depressions corresponding to an associated core recess and with each of said depressions extending into and filling the associated core recess, said continuous phosphor layer further including an upper surface opposite each of said bottom surfaces of each of said recesses, said upper surface having a spherical or parabolic shape; and
coating a solid reflective layer over said continuous phosphor layer at the internal surface of the screen structure said reflective layer at said internal surface of said screen structure being spherical or parabolic in shape proximate each said transmission member thereby forming a parabolic mirror to reflect light generated in said phosphor layer into an associated core portion resulting in an optical gain such that 90% or more of the light generated in said continuous phosphor layer is transmitted through the substrate as light output.

12. A method of making a continuous thin film, intagliated phosphor screen structure comprising the steps of:
providing a light-transmitting substrate having a plurality of transmission members arranged in parallel extending between an internal surface and an external, display surface, wherein each of the transmission members includes a core portion disposed within a cladding portion;
etching the core portions at the internal surface of the screen structure to form recesses below the level of the cladding portions;
forming a continuous thin film phosphor layer over the entire internal surface of said transmission members and completely covering all the core recesses and cladding portions of said transmission members at said internal surface, said continuous phosphor layer having a plurality of depressions, each of said depressions corresponding to an associated core recess and with each of said depressions extending into and filling the associated core recess, said continuous phosphor layer further including an upper surface opposite each of said bottom surfaces of each of said recesses, said upper surface having a parabolic shape; and
coating said upper surfaces of said recesses with a reflective layer.

13. A method of making a continuous thin film, intagliated phosphor screen structure according to claim 12, wherein said reflective layer is an aluminum film.

14. A method of making a continuous thin film, intagliated phosphor screen structure according to claim 12, wherein said step of forming a continuous thin film phosphor layer includes depositing said continuous thin film phosphor layer by vapor deposition and said continuous phosphor layer over said cladding portions is removed by grinding and polishing.

15. A method of making a continuous thin film, intagliated phosphor screen structure according to claim 12, wherein said step of forming a continuous thin film phosphor layer includes depositing said continuous thin film phosphor layer by vapor depositions, further comprising the step of annealing said continuous phosphor layer wherein said continuous phosphor layer over said cladding portions balls up forming said parabolic shape on said upper surfaces of said phosphor layer.

16. A method of making a continuous thin film, intagliated phosphor screen structure according to claim 15, wherein said continuous phosphor layer deposited into the core recesses is a phosphor precursor, and the annealing step includes reducing the precursor material in a reducing atmosphere.

17. A method of making a continuous thin film, intagliated phosphor screen structure according to claim 16, wherein said phosphor precursor is strontium iodide, and said reducing atmosphere is hydrogen sulfide gas.

18. A method of making a continuous thin film, intagliated phosphor screen structure according to claim 12, wherein said upper surfaces of said phosphor layer and said reflective layer are spherical or parabolic in shape proximate each said transmission member to reflect light generated in said phosphor layer into an associated core portion resulting in an optical gain such that at least 90% of light, generated in said continuous phosphor layer that strikes said reflective layer is reflected through said transmission members.

* * * * *